April 15, 1958     C. W. MacMILLAN     2,830,789
AXLE PRESS FOR AXLES OF AUTOMOTIVE VEHICLES
Filed Aug. 6, 1956     3 Sheets-Sheet 1

Inventor:
Charles W. MacMillan
By Gary, Desmond & Parker
Attys.

April 15, 1958  C. W. MacMILLAN  2,830,789
AXLE PRESS FOR AXLES OF AUTOMOTIVE VEHICLES
Filed Aug. 6, 1956  3 Sheets-Sheet 2

Inventor:
Charles W. MacMillan
By Gary, Desmond & Parker
Attys.

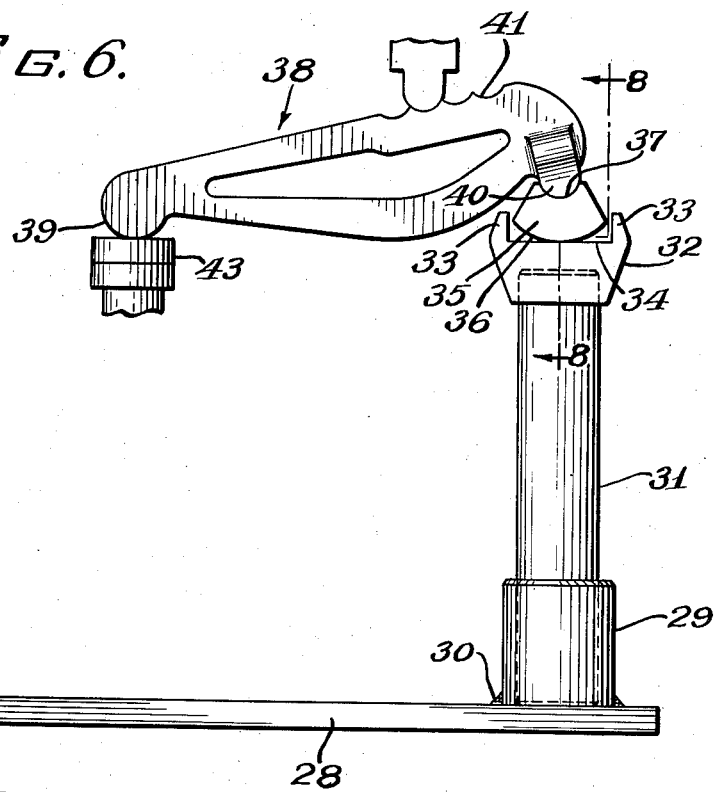
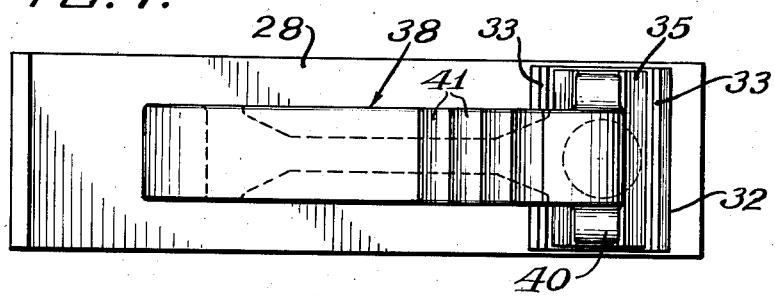
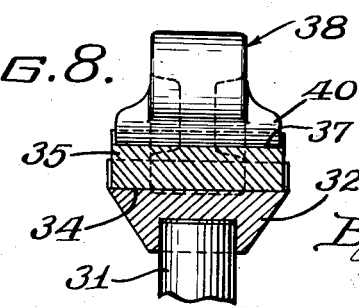

United States Patent Office 2,830,789
Patented Apr. 15, 1958

2,830,789

AXLE PRESS FOR AXLES OF AUTOMOTIVE VEHICLES

Charles W. MacMillan, Rock Island, Ill., assignor to Bear Manufacturing Company, Rock Island, Ill., a corporation of Delaware Application August 6, 1956, Serial No. 602,121

5 Claims. (Cl. 254—93)

This invention relates to improvements in an axle press or straightener for axles of automotive vehicles and refers particularly to an axle press which substantially positively holds all the parts together during the pressing operation and reduces the possibility of slippage to a minimum.

In the operation of straightening axles of automotive vehicles hydraulic means is employed which develops up to 255 tons per square inch. One of the difficulties in handling forces of this magnitude is that, although during lower pressures the press assembly appears to be rigid and firm, when the higher pressures are brought to bear on the assembly slippage of the parts occur which may injure the vehicle and is dangerous to the operator.

In addition, since normally, during the axle straightening operation the vehicle is raised off of its front wheels by jacks or by a chain hoist, there is nothing to prevent lateral movement of the front end as a unit other than the friction of the rear wheels and the inertia of the vehicle. It is possible, therefore, that the vehicle and axle might move sideways sufficiently to allow the force linkage to fly out of place.

As a feature of the present invention means is contemplated for rigidifying certain of the parts and so contriving other parts that the application of the forces are always applied to stabilized elements and the possibility of slippage is reduced to a minimum.

Other objects, advantages and features of the invention will be apparent from the accompanying drawings and following detailed description.

In the drawings,

Fig. 6 is an enlarged elevational view showing the bending arm and rocker assembly.

Fig. 7 is a top plan view of the bending arm and rocker assembly shown in Fig. 6.

Fig. 8 is a detailed sectional view taken on line 8—8 of Fig. 6.

Figure 1:
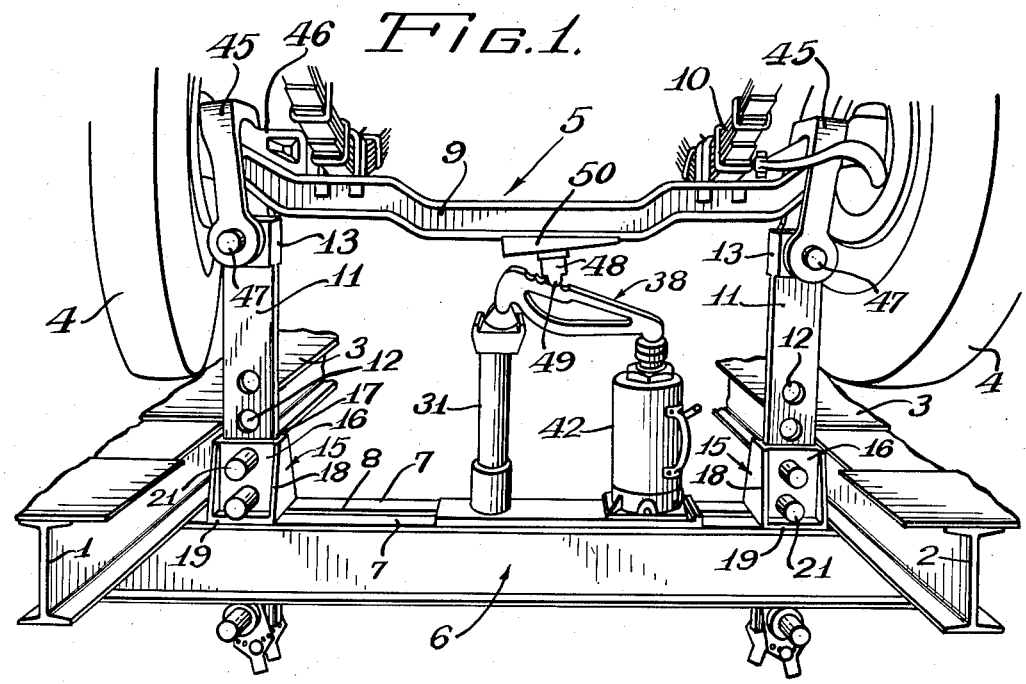
Fig. 1 is a front elevational view of the improved axle press as applied to the front axle of an automotive vehicle.
Figure 2:
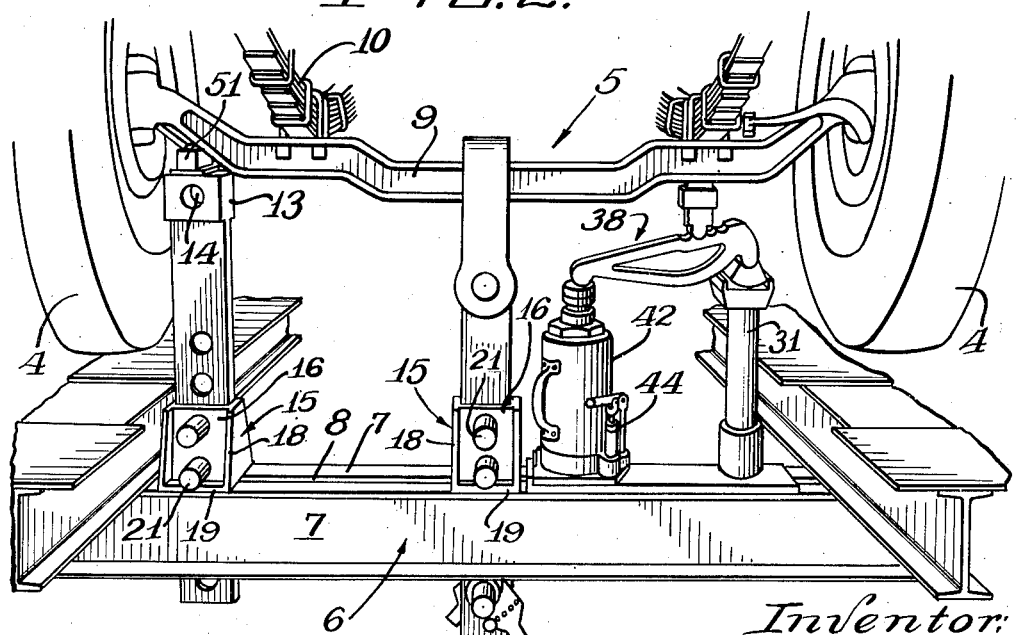
Fig. 2 is a view similar to Fig. 1 showing the press applied to a different portion of the axle.
Figure 3:
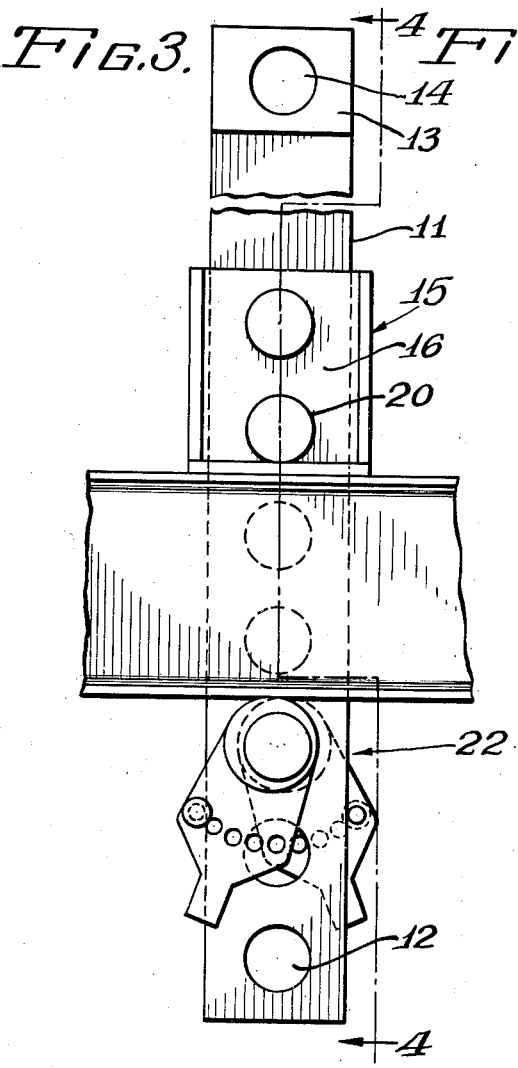
Fig. 3 is an enlarged detailed elevational view of a connector, support therefor and cam lock employed in the press.

Referring in detail to the drawings, 1 and 2 indicate opposite parallel beams which support plates 3 which may be employed as a runway for wheels 4 of an automotive vehicle, the front end portion of which is indicated generally at 5 in Figs. 1 and 2. The beams 1 and 2 may be supported by suitable means (not shown) and are preferably disposed in spaced relationship to the shop or garage floor. A press beam 6 may be secured to the bottoms of beams 1 and 2 and transversely spans the latter beams. The press beam 6 preferably comprises a pair of reinforced I-beams 7 spaced to provide a slot 8 therebetween.

The front end of the vehicle comprises a front axle 9 which carries wheels 4 at its opposite ends, said axle supporting the front end of the vehicle, proper, upon conventional springs 10. In the use of the invention as shown and described, the vehicle, during the pressing operation, is raised off its front wheels by conventional means (not shown) such as, jacks or a chain hoist. In this environment the press beam 6 is fixed to the beams 1 and 2. However, the invention finds equal adaptability where the vehicle remains supported upon its wheels, in which case a suspended press beam may be employed, that is, a beam which is movable relative to beams 1 and 2 and with respect to axle 9. In either case the forces exerted are between the press beam and the axle and the advantages of the invention therefore accrue.

In Fig. 1 the invention is shown as being employed in increasing camber on both sides, that is, the central portion of the axle is bent upwardly relative to both ends thereof, or conversely considered, the ends of the axle are moved downwardly relative to the central or main portion of the axle.

Figure 4:
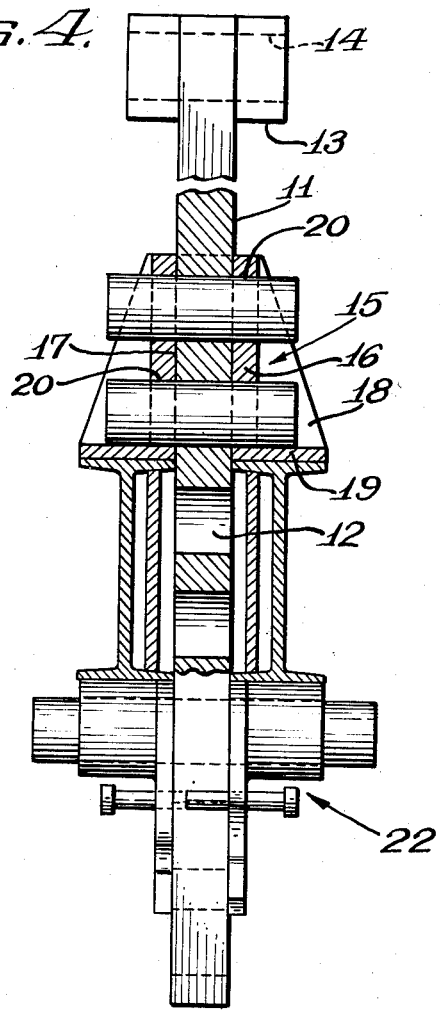
Fig. 4 is a detailed sectional view taken on line 4—4 of Fig. 3.
Figure 5:
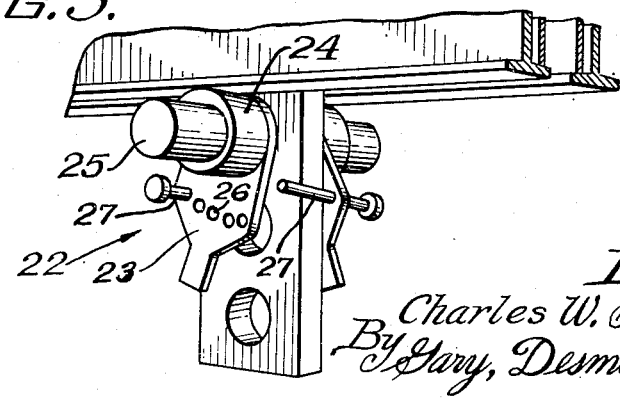
Fig. 5 is a perspective view of the cam lock.

The axle press employed with the press beam 6 comprises a pair of connectors 11 which comprise metal bars provided adjacent one end with a plurality of aligned apertures 12 and at the opposite end each of said connectors is of increased thickness, as shown best at 13 in Figs. 1, 2 and 4, the latter portion also being provided with an aperture 14. The connectors 11 are of such thickness as to be insertable in slot 8 and are of slightly less thickness than the width of said slot.

A connector support 15 is employed with each connector, each support comprising spaced web portions 16 which provide a slot 17 therebetween for the slidable reception of a connector. The webs at their opposite side edges carry flanges 18 and at their bottom edges terminate in a base 19. The webs 16 are provided with a pair of apertures 20 which are spaced from each other a distance equal to the spacing of each two adjacent apertures 12 in the connector whereby pins 21 may be inserted through pairs of apertures 12 and 20.

Referring particularly to Figs. 3, 4 and 5, 22 indicates generally the cam lock employed with the invention. Each cam lock comprises a cam plate 23 at one end of which is a sleeve 24 having an eccentric outer surface. Two such cam plates and sleeves are employed with each connector. In utilizing the cam lock a pin 25 is threaded through the sleeves 24 and through an aperture 12 immediately beneath the press beam 6 disposing a sleeve 24 on each side of the connector. The apertures 12 are so spaced in the connector that when pins 21 are threaded through apertures 12 and 20 in support 15, an aperture 12 will be disposed immediately beneath beam 6 and sufficient space will exist between a pin 25 and the lower face of the press beam to thread the sleeves upon the pin 25 with the thinnest portion of the wall of each sleeve between the pin and the press beam bottom face.

The operation is such that after the sleeves 24 have been threaded on a pin 25, as hereinbefore described, the plates 23 may be rocked about pin 25 thus wedging thicker portions of the sleeve walls between the pin and the bottom of the press beam. This action tensions the connector between pin 25 and the pins 21 and, hence, securely locks the connector upon the press beam.

Each cam plate 23 is provided with a plurality of arcuately disposed holes 26. A pin 27 may be inserted through a desired hole and after the cam plates 23 have been rocked, as hereinbefore described, pins 27 may be inserted through appropriate holes in the cam plates to hold the cam plates in their rocked position, said pins laterally bearing upon the edges of the connector.

Referring particularly to Figs. 6, 7 and 8 the force-producing mechanism for the axle press is shown. The force-producing mechanism comprises a platform or base 28 which at one end carries a sleeve 29 which may be rigidly secured to the base, preferably by welding, as at 30 in Fig. 6. The sleeve 29 is vertically positioned and is open at its upper end to telescopically receive a post 31. A rocker head 32 is carried at the upper end of post 31, said head carrying opposite flanges 33 which define a bearing space 34 at the top of the head. A rocker 35 is adapted to be carried upon the bearing surface 34 between flanges 33. Rocker 35 comprises a metal block having an arcuate lower surface 36 and an arcuate groove 37 at its upper portion.

A bending arm 38 comprises a portion of the force-producing mechanism and comprises a metallic lever which at one end terminates in an arcuate head 39. The other end of the arm 38 carries an integral arcuate nose 40 which conforms in radius of curvature substantially the radius of curvature of the arcuate groove or seat 37 of rocker 35. The upper side of the arm 38 is provided with a plurality of contiguous grooves, the purpose of which will be hereinafter more fully described.

In the operation of the force-producing mechanism, a conventional hydraulic jack 42, only the ram head 43 which is shown in Fig. 6, is positioned upon base 28. The arcuate head 39 of the bending arm is adapted to be positioned on the ram head 43 and the nose 40 is adapted to be positioned upon rocker 35. Thus, a leverage arrangement is provided for exerting an upwardly directed force when jack pump 44 is manipulated.

As has been hereinbefore described, Fig. 1 shows the axle press comprising the present invention employed in the increasing of chamber on both sides of the front axle 9 of an automotive vehicle. The front end portion of the vehicle may be raised by any suitable means, to raise the wheels 4 off the runway 3. The connector supports 15 may be threaded upon each of the connectors 11 and the lower portions of the connectors may be inserted in the slot 8 provided in the press beam 6 adjacent each end of said beam. Pins 21 may then be inserted through apertures 20 and 12 in the connector supports and connectors respectively and cam locks 22 may be mounted upon the lower ends of the connectors by the insertion of the pins 25 through the sleeves 24 carried by the cam plates 23 and through the aperture 12 disposed immediately beneath the lower surface of the press beam 6.

Before the connectors 11 are rigidly mounted upon the press beam 6 yokes 45 may be positioned over the end portions of the axle 9. If necessary, to prevent the slipping of the yokes 45 upon the axle, wedge blocks 46 may be employed. The ends of each of the yokes 45 are apertured and a pin 47 may be inserted through each of the apertures and through the aperture 14 provided in the head portion 13 of each of the connectors 11.

The force-producing mechanism may then be positioned upon the central portion of the press beam 6, the base 28 of said mechanism resting upon the upper flanges of the I-beams 7. The bending arm 38 may then be positioned upon the ram head 43 of the jack 42 and upon the rocker 35 carried by the post 31. In initially setting the apparatus in operative position the ram head 43 is in fully retracted position. A pivot block 48 having an arcuate nose portion 49 may then be positioned so as to dispose the nose portion 49 in a desired groove 41 upon the upper portion of the bending arm 38. A wedge block 50 may be driven between the base of the block 48 and the lower face of the axle 9 until the block assembly and the arm 38 are in relatively rigid position.

The cam locks may then be manipulated to apply tension to the connectors 11 between the pins 21 and 25 whereby said connectors are securely, rigidly mounted upon the press beam 6. The jack 42 may then be manipulated and it can readily be seen that as the head 39 of the arm 38 moves upwardly an upwardly directed force is applied to the central portion of the axle 9 through the bending arm 38. It will be noted that the press structure is rigidified at the end portions thereof, that is, that connectors 11 are rigidly mounted upon the press beam 6. Moreover, it will be further noted that when the force is applied by the jack and the bending arm 38 moves, the contacting surfaces associated with the bending arm, all being arcuate, transmit their respective forces at right-angles to the various arcs and hence although the bending arm moves, the contacting surfaces associated with said arm are always in stabilized position and hence the possibility of slippage is reduced to a minimum.

In Fig. 2 the use of the axle press is illustrated in decreasing the camber at both ends of the axle. In this case the endmost connector 11 will be placed under compression and a block 51 may be positioned upon the upper portion of the connector whereby non slipping contact may be made with the under surface of the end of the axle. The connector 11 in this position, during the pressing operation, will be under compression.

The other connector may be secured to the central portion of the axle 9 by means of a yoke 45 and during the pressing operation this connector will be subjected to tension. The cam locks may be applied to each of the connectors or if desired the cam lock may only be applied to the connector which is under tension.

The force-producing mechanism comprising the jack 42, post 31 and bending arm 38 will then be positioned adjacent the opposite end of the axle and will exert its force upwardly.

Of course, the axle press comprising the present invention may be employed in many other ways than those hereinbefore described, the description being merely set forth to illustrate the manner in which the various parts comprising the axle press may be operated and principally to emphasize the rigidity of the connector structures and the stability of the force-producing mechanism. If desired the post 31 may be rigidly secured to the sleeve 29 or said post may be removably positioned in the sleeve in which case posts of different lengths may be interchangeably employed. These and other changes may be made by anyone skilled in the art without departing from the spirit of the invention and hence it is not intended that the invention be limited to the exact details shown and described except as necessitated by the appended claims.

I claim as my invention:

1. A force-producing device comprising an hydraulic jack having a ram head, a post positioned adjacent said jack having its axis substantially parallel to the path of movement of said ram head, a lever separable from the ram head and post, one end of said lever being rounded and making rocking contact with the ram head, a rocker having a rounded bottom making rocking contact with said post, said rocker having a concave top, the opposite end of said lever being rounded and resting on said concave top of said rocker, and separable means carried by said lever at an intermediate portion of one side thereof for making force contact with a member to which the force is to be applied.

2. A force-producing device comprising an hydraulic jack having a ram head, a post positioned adjacent said jack having its axis substantially parallel to the path of movement of said ram head, a lever separable from the ram head and post, a cylindrical surfaced nose carried at one end of said lever making rocking contact with said ram head, a rocker having a convex cylindrical surface and an opposite concave cylindrical surface, said convex surface of said rocker making rocking contact with said post, a nose having a cylindrical surface carried at the opposite end of said lever making substantially registering contact with the concave surface of said rocker, and separable means carried by said lever at an intermediate portion of one side thereof for making force contact with a member to which the force is to be applied.

3. A device as claimed in claim 2 wherein said side of said lever is provided with a plurality of cylindrical indentations and said last-mentioned separable means comprises a cylindrical nose portion making substantially registering contact with one of said indentations.

4. A device as claimed in claim 2 wherein the concave and convex surfaces of said rocker are substantially coaxial.

5. A force-producing device comprising a foundation plate, an hydraulic jack mounted on said plate, said jack having a ram head movable at right-angles to said plate, a post positioned adjacent said jack on said plate and extending at right-angles to said plate, a lever separable from the ram head and post, one end of said lever being rounded and making rocking contact with the ram head, a rocker having a rounded bottom making rocking contact with said post, said rocker having a concave top, the opposite end of said lever being rounded and resting on said concave top of said rocker, and separable means carried by said lever at an intermediate portion of one side thereof for making force contact with a member to which the force is to be applied.

References Cited in the file of this patent

UNITED STATES PATENTS

| | | |
|---|---|---|
| 1,400,297 | La Brant | Dec. 13, 1921 |
| 1,777,686 | Bagge | Oct. 7, 1930 |
| 1,815,180 | Bennett | July 21, 1931 |
| 1,819,311 | Wochner | Aug. 18, 1931 |

FOREIGN PATENTS

| | | |
|---|---|---|
| 505,738 | Belgium | Sept. 29, 1951 |